E. E. WICKERSHAM.
CHAIN TRACK TRACTOR.
APPLICATION FILED NOV. 5, 1918.
1,413,148.
Patented Apr. 18, 1922.
5 SHEETS—SHEET 1.
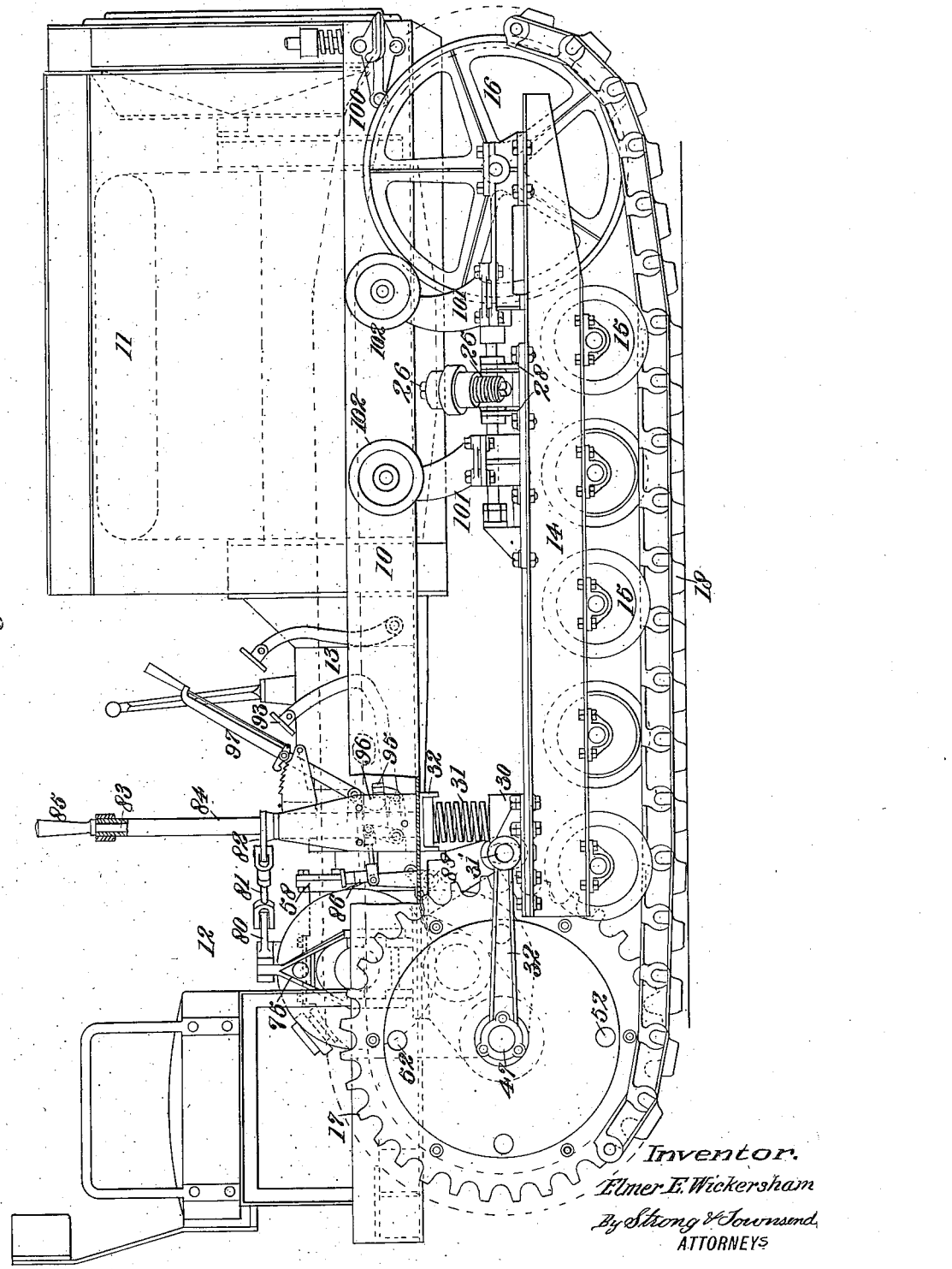

E. E. WICKERSHAM.
CHAIN TRACK TRACTOR.
APPLICATION FILED NOV. 5, 1918.
1,413,148.
Patented Apr. 18, 1922.
5 SHEETS—SHEET 2.
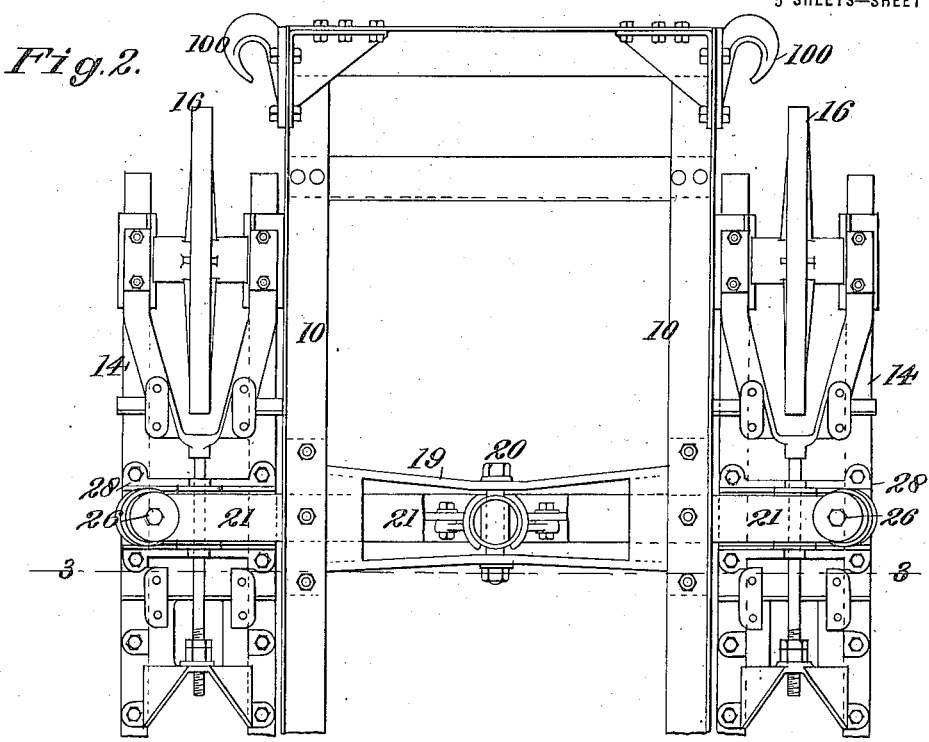
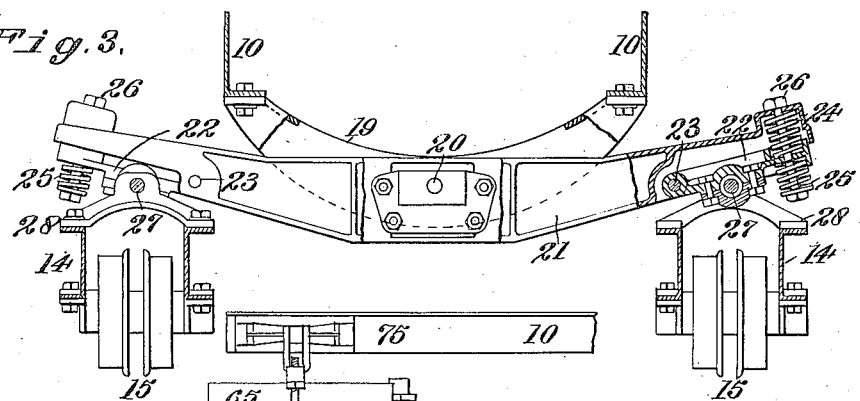
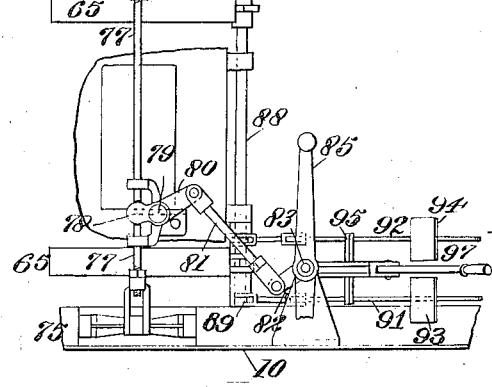
INVENTOR
Elmer E. Wickersham
BY
Strong & Townsend
ATTORNEYS

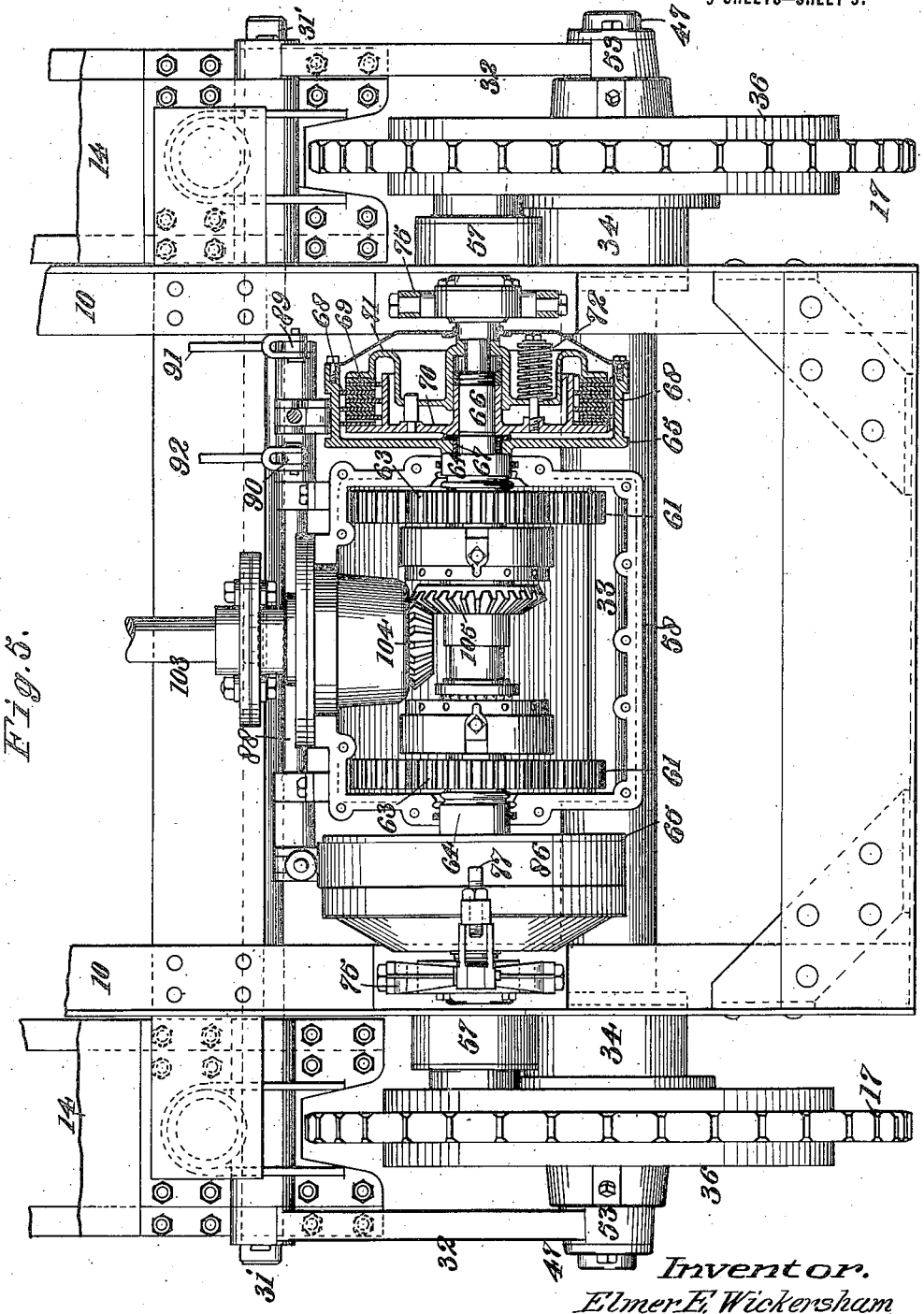

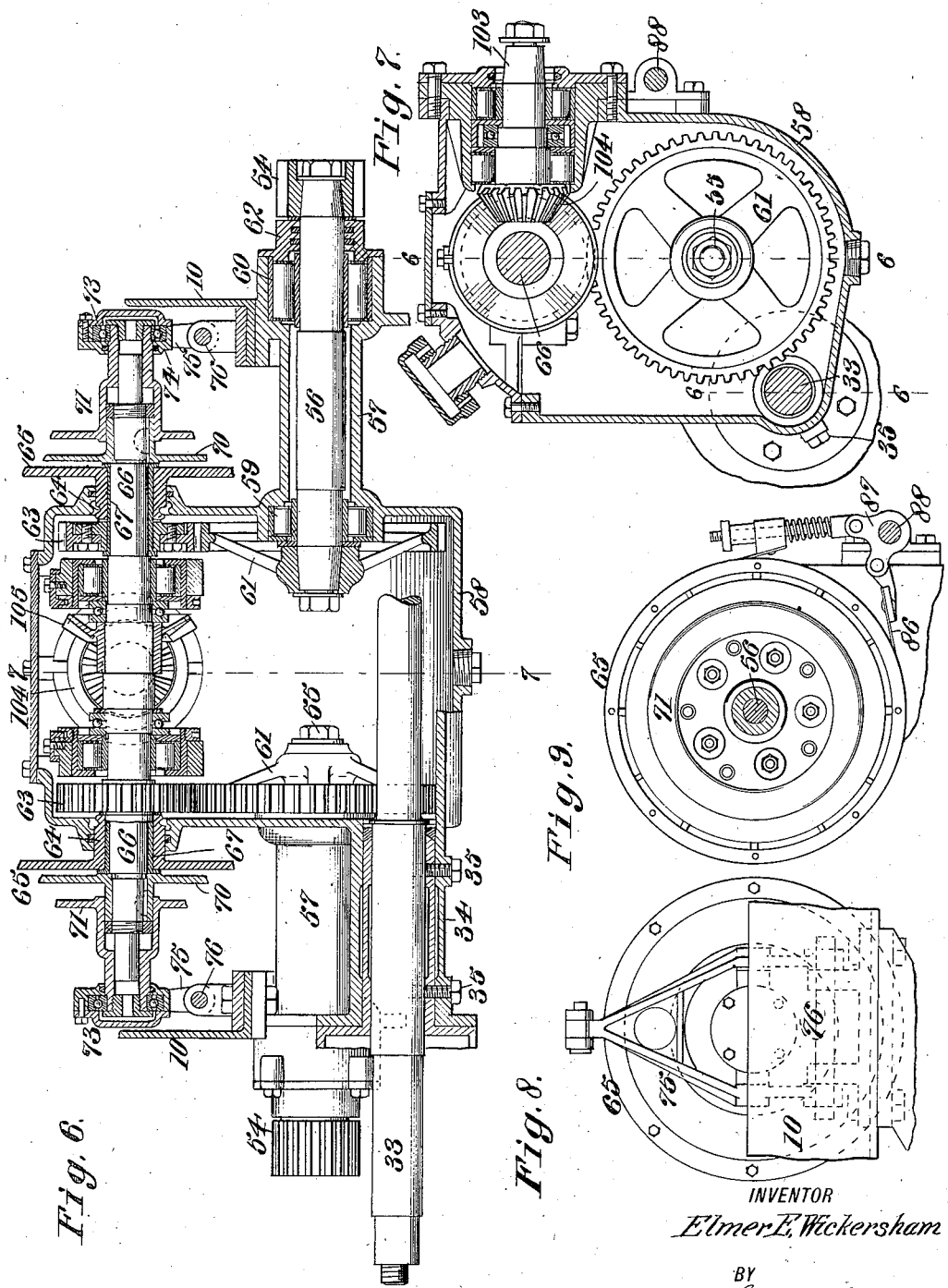

E. E. WICKERSHAM.
CHAIN TRACK TRACTOR.
APPLICATION FILED NOV. 5, 1918.
1,413,148.
Patented Apr. 18, 1922.
5 SHEETS—SHEET 5.
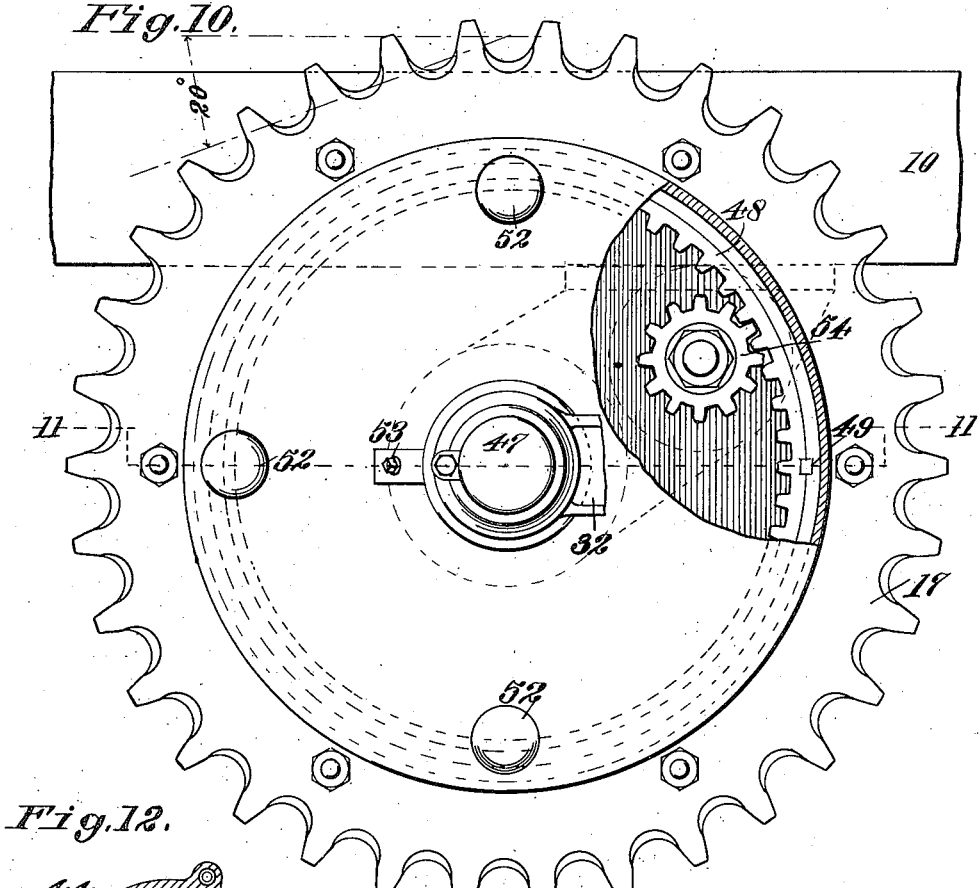
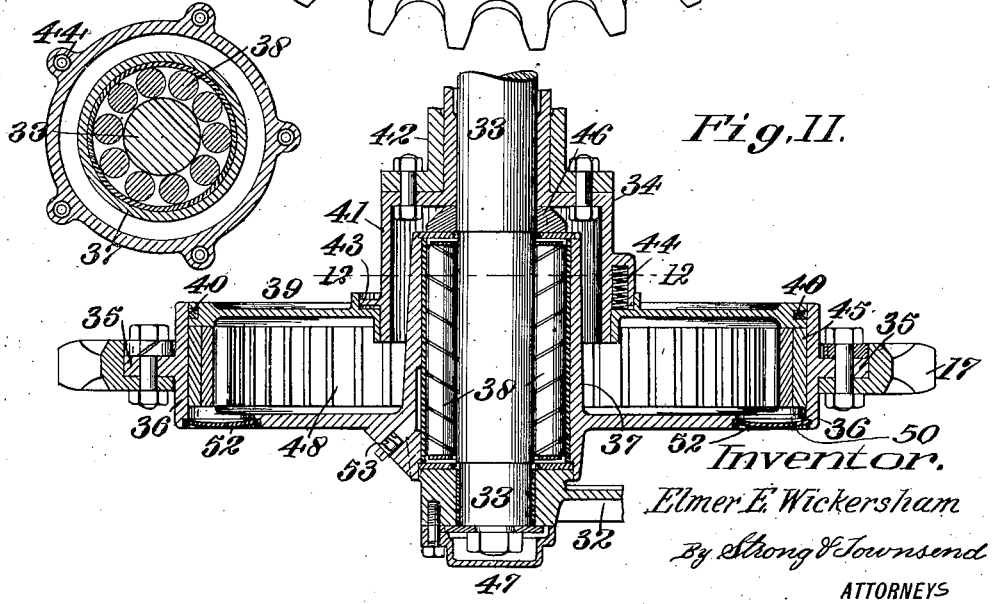
Inventor.
Elmer E. Wickersham
By Strong & Townsend
ATTORNEYS

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

CHAIN TRACK TRACTOR.

1,413,148.      Specification of Letters Patent.     Patented Apr. 18, 1922.

Application filed November 5, 1918. Serial No. 261,177.

*To all whom it may concern:*

Be it known that I, ELMER E. WICKERSHAM, a citizen of the United States, residing at Stockton, in the county of San Joaquin and State of California, have invented a new and useful Improvement in Chain Track Tractors, of which the following is a specification.

This invention relates to a motor vehicle and particularly pertains to a tractor of the self-laying chain track type. Experience has proven that it is desirable to provide a vehicle, the running gear of which will be decidedly flexible in relation to the main frame, thus permitting the traction members of the running gear to readily conform to the contour of the terrain. The rotary members of the traction elements have also become filled with dust and dirt. One of the principal objects of this invention, therefore, is: a traction wheel construction adapted to enclose suitable driving gears and bearings to exclude dust and dirt and to retain the oil in a desirable condition.

Another object of the present invention is to provide a power transmission mechanism which will allow the separate traction units at the opposite side of the main frame to be driven at variable speeds and which will insure that the driving of the units will take place through a mechanism simple in its construction and direct in its action.

Other objects will appear hereinafter.

The invention is illustrated by way of example in the accompanying drawings, in which—

Fig. 1 is a view in side elevation, illustrating the completely assembled tractor with parts of the chain and the main frame broken away to more clearly disclose the mechanism.

Fig. 2 is a fragmentary view in plan, disclosing the rear portion of the main frame and the manner in which the truck rollers are connected therewith.

Fig. 3 is a view in transverse section and elevation, illustrating the equalizer bar shown in Fig. 2 and further disclosing the hanger by which it is connected to the main frame.

Fig. 4 is a fragmentary view in plan, illustrating the control mechanism for the steering clutches.

Fig. 5 is an enlarged view in section and elevation disclosing the construction of the transmission and the manner in which the separate traction units are variably driven therefrom.

Fig. 6 is a fragmentary view as seen on the line 6—6 of Fig. 7, clearly disclosing the driving mechanism of the transmission and the clutch connections therewith.

Fig. 7 is a view in transverse section as seen on the line 7—7 of Fig. 6, illustrating the relative positions of the clutch shafts, the gear shafts and the axle.

Fig. 8 is a fragmentary view in end elevation, disclosing one of the clutches and one of its shifting yokes.

Fig. 9 is a view in end elevation, illustrating one of the clutches and the brake band by which its outer drum may be retarded.

Fig. 10 is an enlarged view in end elevation showing one of the chain sprockets with parts broken away to more clearly show its driving connection.

Fig. 11 is a view in section taken through the sprocket, as shown in Fig. 10 and illustrating in detail the manner in which the driving gears are housed within the body of the sprocket and the bearings enclosed to exclude dust.

Fig. 12 is a view in section, as seen on the line 12—12 of Fig. 11, illustrating the concentric relation of the shaft sleeve and the bearings disposed thereon.

Referring more particularly to the drawings, 10 indicates a main frame provided with the usual parallel side bars, which are connected at their opposite ends by crossrails to form a rectangular frame structure. At the forward end of this structure a power plant mechanism 11 is mounted and near the rear end of the frame a power transmission mechanism 12 is positioned. Interposed between the transmission mechanism 12 and the power plant, is the usual gear set 13 by which the transmission mechanism may be variably driven. The vehicle is provided with a running gear which comprises chain track units which are disposed at the opposite sides of the main frame. Each unit consists of a roller truck frame 14 carrying a series of load supporting rollers 15, an idler wheel 16 positioned at the front of the truck frames, a sprocket wheel 17 at the rear of each truck frame and an articulated track 18 which passes over the sprocket and idler wheels and also around the truck members 14. The connection between the forward ends of the trucks 14 and the main frame is clearly shown in Figs. 2 and 3. Here it will be seen that a cross-beam or hanger 19 is fastened to the side rails of the main frame and formed with a central opening through which a block and pin 20 may extend. The block and pin connect an equalizer bar 21 with the cross-hanger 19 and further provide a limited universal movement between the equalizer bar and the cross-member, as more particularly disclosed in a co-pending application bearing the Serial Number 236,524 and filed May 25, 1918.

Pivotally connected to the opposite ends of the equalizer bar are arms 22 which are secured to the bar by pins 23 and extend laterally of the tractor. The outer ends of these arms may swing freely as cushioned by compression springs 24 and 25, one of which is disposed at each side of the arm and held in position by a bolt 26. The arms 22 are to carry longitudinally extending pins 27. These pins pivotally engage hangers 28 which form a part of the trucks 14 and unite the side rails thereof, as shown in Fig. 3. The cross-members 28 are positioned near the forward forked ends of the trucks and thus connect the separate traction units with the main frame in a manner to allow the forward ends to swing in relation to each other and to have yieldable movement in relation to the equalizer beam 21, due to the action of the springs 24 and 25.

The rear ends of the truck frames 14 are provided with spring seats 30, upon which compression springs 31 are positioned. These springs are interposed between the seats and the cross-beam 32 rigidly fixed to the underside of the main frame and overhanging the side rails thereof. The spring seats 30 also receive thrust pins 31' adapted to pivotally engage thrust rods 32 rotatably mounted upon the opposite ends of an axle 33. This axle is shown in Fig. 6, it being understood that it is fixed against rotation within a transmission case 34 by means of set screws 35 which enter recesses in the side of the shaft.

Referring to Fig. 11, it will be seen that the axle 33 is provided as a mounting for the chain track driving sprockets 17. One of these sprockets is here shown as counter-bored and seats upon an annular flange 35 formed upon a drum 36. This drum has an outer closed end which is formed integral with a tubular hub 37 adapted to receive anti-friction bearings 38 and to be rotatably supported upon the axle 33 thereby. The end of the drum forms the outer face of the wheel structure and its hub extends inwardly. The opposite opened end of the drum is closed by a cover plate 39 which securely fits within the opened end of the drum and carries a dust-washer 40 adapted to prevent the passage of dirt or other foreign material through the joint between the cover and the drum. This cover is slidably mounted around a sleeve 41 bolted to the axle housing 42. This sleeve is formed with an annular flange adapted to be seated within a cup-shaped recess 43 on the outer face of the cover. A plurality of expansion springs 44 act between the sleeve 41 and the cover to normally press the cover inwardly and to cause it to bear against a ring 45 secured around the inner circumference of the drum. The sleeve 41 encloses the inner end of the hub 37 and forms a grease-pocket for the bearings. A packing washer 46 is interposed between the end of the hub 37 and a shoulder on the sleeve 41, thus preventing grease and oil traveling along the axle 33. The outer end of the axle is covered by a dust-cap 47 which is bolted to the thrust rod and encloses the end of the axle as shown in Fig. 11. The ring 45 carries an internal gear 48 which is keyed in place by a plurality of square keys 49. Openings 50 are formed through the end of the drum 36 to permit a key-cutting member to pass therethrough and form key-ways for the keys 49. These openings are afterwards closed by metal disks 52 which are sprung into position and seal the interior of the drum. The bearings may be greased through a gland 53. The gears 48 are driven by spur driving gears 54 which are keyed to the opposite ends of driving axles 55 and 56. These axles are particularly shown in Fig. 6, where it will be seen that they are arranged in spaced relation to each other and in longitudinal alignment within bearings 57 forming the opposite sides of a transmission case 58. The shafts 55 and 56 are rotatably supported by anti-friction bearings 59 and 60 which are disposed near the opposite ends of the shaft and properly support it while being driven by driving gear wheels 61. Interposed between the gears 54 and the bearings 60 are dust-proof sleeves 62. The gears 61 derive their power from gears 63 with which they mesh. These gears are carried upon the hubs 64 of clutch drums 65 and are further mounted upon a clutch shaft 66 which extends through the transmission housing in parallel relation to the gear shafts 55 and 56. The hubs of these drums are carried directly upon bushings 67 mounted on the clutch shaft 66 so that the shaft may freely rotate without producing rotation of the clutch drum when this member is disengaged. It will be understood that the clutch may be of any desired design; however, it is indicated in Fig. 5 as possessing a plurality of disks 68 fixed to the drum and between which are a plurality of disks 69 carried upon a clutch spider 70. The spider 70 is mounted upon a reduced portion of the clutch shaft to prevent end-wise motion and is furthermore keyed to rotate with the shaft. A pressure disk 71 is provided with a hub within which the hub of the spider 70 telescopes. This disk also exerts pressure to cause frictional engagement between the various friction disks 68 and 69, as produced by pressure exerted by expansion springs 72. The hubs of the pressure disks 71 are slidably mounted upon reduced extensions of the shaft 66 and further provide a seat for ball bearings 73 which are carried within the bearings 74 of shifting yokes 75. These yokes are mounted, as will be understood, at the opposite ends of the shaft 66 and may be selectively operated by means of the mechanism shown in Fig. 4.

Each of the yokes is pivoted upon a rod 76 carried upon the main frame of the tractor. The upper free ends of the yokes are provided with shafts 77. Due to the arrangement of the control mechanism, one of these shafts is shorter than the other; however, the operation is not impaired by this design. The shafts 77 extend horizontally and in longitudinal alignment with each other and furthermore abut against the opposite sides of a shifting cam 78. The contour of the face of this cam is substantially circular, thus insuring that proper bearing surface will be in contact with both of the rods 77 at all times. The cam 78 is pivotally mounted upon an upright shaft 79 and is formed integral with the shifting lever 80. This lever is provided with a connecting rod 81, extending forwardly to a lever 82. The lever 82 is fixed to the lower end of a steering shaft 83 mounted within a column 84. The upper end of this shaft is provided with a steering crank 85 by which the shaft may be rotated in either direction. It will be readily recognized that by rotation of the shaft in either direction, one of the levers 77 will be thrust outwardly and will thereby act against the expansion springs 72 to withdraw the pressure disk 71 from its respective clutch and thus disengage the multiple disk members thereof.

The outer surfaces of the clutch drums are used to form parts of the service brakes of the vehicle. Around these circumferences, brake bands 86 are disposed and may be contracted by a tensioning member 87 which is mounted upon a rock shaft 88. The shaft 88 is rotatably mounted upon the front of the transmission housing and extends across the vehicle to the lefthand service brake. Its opposite end carries a brake lever 89 freely mounted thereupon to engage the righthand brake mechanism. The righthand brake lever 89 and a lefthand brake lever 90, the latter of which is fixed to the shaft, are provided with forwardly extending brake rods 91 and 92 respectively, which are connected with pedals 93 and 94. Secured across both of said pedals is a bar 95 adapted to be engaged by a lower extension 96 of an emergency lever 97. When this lever is pushed, both of the pedals will be simultaneously actuated to set both of the service brakes at once. Otherwise the brakes may be separately manipulated by the pedals 93 and 94 to assist the clutch mechanism in producing variable speeds of rotation in the two transmission units and thereby cause a steering action to be effected.

A pair of draw bar hooks 100 are provided and are bolted to the opposite sides of the main frame, as particularly shown in Fig. 2. Due to this arrangement, a straight pull will be produced upon the main frame without twisting or torsion action thereupon. In practice, the vehicle is assembled, as clearly shown in Fig. 1, with the main frame yieldably mounted upon the truck frames 14 by means of the cross equalizer bar 21 and the compression springs 31. It will thus be seen that upward movement of one roller frame, at its forward end, will tend to effect downward movement of the opposite roller frame. This action will, of course, lift the main frame one-half the distance of the inequality in level between the tracks of the two traction units. Minor vibrations in the roller trucks will be absorbed by the springs 24 and 25, while the rear ends of the trucks will be yieldably held by the compression springs 31. The rear ends of the truck frames will be tied to the axle 33 by the thrust rods 32 and will therefore swing around the axis. In order that the upper run of chain track may be supported during the movement of the trucks, a series of standards 101 are fixed upon the truck members 14 and carry idler rollers 102 over which the chain tracks pass.

As the vehicle power plant operates through the gear set 13, a propeller shaft 103 will be driven. This shaft is shown in Fig. 7 as rotatably mounted in the forward side of the rear transmission case and is fitted with a bevel gear 104 in mesh with a gear 105 keyed to the clutch shaft. As the shaft 66 rotates, both of the clutch drums 65 will be rotated as they are locked in engagement with the clutch spiders by means of the complementary disks 68 and 69, it being understood that these disks are held in frictional engagement by the expansive action of the springs 72 acting against the pressure plates 71. As both of the clutches are in engagement, the two gears 63 will, of course, be rotated and will impart their rotation to the large spur gear 61 carried separately by the driving shafts 55 and 56. Rotation of these shafts in turn will directly drive the spur gears 54 which are mounted upon the opposite outer tapered ends of the two driving shafts and which are in mesh with complementary ring gears 48. These ring gears, as previously described, form a part of the driving unit of each sprocket 17 and cooperate with the spur gears 54 to cause the sprockets to drive at a speed greatly reduced in comparison with the speed of rotation of the shafts 55 and 56.

The driving of the ring gears 48 will, of course, drive the drums 36, and as these drums are mounted upon the anti-friction bearings 38, carried on the axle 33, desirable rotation of the sprockets 17 will be effected. As the drums are driven, the cover plates 39 will bear against the inner faces of the rings 45 and will act to entirely seal the interior of the drums to thus protect the gears and prevent the accumulation of dirt therein.

In steering the vehicle, the separate clutch drums may be released or engaged by swinging the steering lever 85 and thereby rotating the column 83. This will act through the crank 82 to swing the lever 80 in the desired direction and as this lever swings in one direction, will cause an outward movement of one of the rods 77 in the opposite direction. This action will relieve the pressure of the springs 72 from the plate 71 and the disks 68 and 69, thus causing the corresponding drum to become disengaged. This will decrease the driving speed of the sprocket on this side of the machine and will permit the driving speed of the sprocket on the opposite side to continue at its normal rate.

By varying the degree of slippage between the disks 68 and 69, various speed ratios may be established between the sprockets 17 on the opposite sides of the vehicle and the tractor will thus be caused to pursue any arcuate course of travel desired. The slippage of one clutch will cause the vehicle to turn to the side of the rod corresponding to the clutch slipped. This action may be assisted by the selective manipulation of the service brakes 86, as these brake bands may be separately tightened by pressing upon the pedals 93 or 94. It will thus be evident that by independent manipulation of the two clutches and operation of the brake bands, the vehicle may be dirigibly controlled in a flexible manner. In case of emergency, the brake lever 97 may be operated and both of the brakes set at once.

It will thus be seen that a tractor construction is here provided which embodies desirable frame suspension means, steering means and a transmission mechanism direct in its action, flexible in its operation and housed in a manner to protect it at all times.

Having thus described my invention, what I claim and desire to secure by Letters Patent is—

1. In a track laying tractor, a transversely extending axle, a bearing for the axle carried by the main frame, a driving sprocket wheel journaled on the outer end of the axle, said sprocket wheel being in the form of a drum, open at its inner side and fitted with an internal gear on its rim, an annular flange on said bearing adjacent the open side of the drum, a cover plate fitted between the rim of the drum and said annular flange, a driving shaft extending through the cover plate, and a pinion on the driving shaft meshing with the internal gear.

2. A combination set forth in claim 1, including a packing member between the rim of the drum and said cover plate forming an oil-tight and dust-proof joint.

3. In a track laying tractor the combination with a main frame, an axle fixed thereto, inner and outer bearings for each end of the axle, a driving sprocket wheel comprising a hub journaled on the axle between said inner and outer bearings, a rim concentric with the hub and formed with sprocket teeth on its exterior, and spur teeth on it interior, an integral plate connecting the hub and rim at the outer sides, an annular flange on the inside bearing, a disk fitting around said flange and extending to the rim of the sprocket wheel, a driving shaft extending through said disk and a pinion on the driving shaft meshing with the spur teeth on the interior of the rim.

4. The combination set forth in claim 3, including means for forming oil-tight and dust-proof joints between the disk and rim of the sprocket wheel and between said hub and each of the bearings.

5. In a track laying tractor, the combination with the main frame, a transversely extending axle fixed thereto, a driving sprocket wheel comprising a hub which is rotatably mounted on said axle, a rim concentric with the hub, a disk connecting and closing the space between the outer end of the hub and the outer edge of the rim, an internal gear ring fixed within said rim, a stationary disk mounted on the axle and fitted within said rim at the inside thereof, means to form an oil-tight and dust-proof joint between said disk and rim, a driving shaft extending through said disk, and a pinion on the end of the driving shaft meshing with the internal gear ring.

6. In a track laying tractor, a transversely extending axle, a bearing for the axle, carried by the main frame, a drum freely rotatable on the axle, and open on its inner side, a ring having chain track sprocket teeth bolted to a flange on the periphery of said drum, a ring gear having internal teeth fitted within said drum, a cover plate for the open side of the drum, a driving shaft extending through the cover plate, and a pinion on the driving shaft meshing with the internal ring gear.

In testimony whereof I have hereunto set my hand in the presence of two subscribing witnesses.

ELMER E. WICKERSHAM.

Witnesses:
F. W. TARR,
F. A. WEAVER.